United States Patent
Schwartzman

(10) Patent No.: US 10,560,136 B2
(45) Date of Patent: Feb. 11, 2020

(54) ANTENNA CONTINUITY

(71) Applicant: Corning Optical Communications LLC, Charlotte, NC (US)

(72) Inventor: Ronen Schwartzman, Rehovot (IL)

(73) Assignee: Corning Optical Communications LLC, Charlotte, NC (US)

( * ) Notice: Subject to any disclaimer, the term of this patent is extended or adjusted under 35 U.S.C. 154(b) by 191 days.

(21) Appl. No.: 15/609,207

(22) Filed: May 31, 2017

(65) Prior Publication Data

US 2017/0346168 A1 Nov. 30, 2017

Related U.S. Application Data

(60) Provisional application No. 62/343,216, filed on May 31, 2016.

(51) Int. Cl.
*H04B 1/40* (2015.01)
*H04W 88/08* (2009.01)

(52) U.S. Cl.
CPC .......... *H04B 1/40* (2013.01); *H04W 88/085* (2013.01)

(58) Field of Classification Search
CPC combination set(s) only.
See application file for complete search history.

(56) References Cited

U.S. PATENT DOCUMENTS

| | | |
|---|---|---|
| 2,628,312 A | 2/1953 | Peterson et al. |
| 4,167,738 A | 9/1979 | Kirkendall |
| 4,935,746 A | 6/1990 | Wells |
| 5,257,407 A | 10/1993 | Heinzelmann |
| 5,513,176 A | 4/1996 | Dean et al. |
| 6,011,962 A | 1/2000 | Lindenmeier et al. |
| 6,108,536 A | 8/2000 | Yafuso et al. |
| 6,195,561 B1 | 2/2001 | Rose |
| 6,253,067 B1 | 6/2001 | Tsuji |
| 6,405,018 B1 | 6/2002 | Reudink et al. |
| 6,437,577 B1 | 8/2002 | Fritzmann et al. |
| 6,490,439 B1 | 12/2002 | Croft et al. |
| 6,580,905 B1 | 6/2003 | Naidu et al. |
| 6,906,681 B2 | 6/2005 | Hoppenstein |
| 6,928,281 B2 | 8/2005 | Ward et al. |
| 6,983,174 B2 | 1/2006 | Hoppenstein et al. |
| 7,035,594 B2 | 4/2006 | Wallace et al. |

(Continued)

FOREIGN PATENT DOCUMENTS

| | | |
|---|---|---|
| WO | 2014064457 A1 | 5/2014 |
| WO | 2017021954 A1 | 2/2017 |

OTHER PUBLICATIONS

Lu, et al., "Coplanar Printed-Circuit Antenna with Band-Rejection Elements for Ultra-Wideband Filtenna Applications," © 2008 IEEE, Sep. 9, 2008, Antennas and Propagation Society Symposium, 4 pages.

(Continued)

*Primary Examiner* — Zhiyu Lu
(74) *Attorney, Agent, or Firm* — C. Keith Montgomery

(57) ABSTRACT

An arrangement for determining a connected state of an antenna component with another component, such as a base unit of remote access unit in a wireless distribution system. The arrangement can include a filter block integrated into an antenna base unit that incorporates all or a part of a circuit configured to determine the connected state. The filter block can be a cavity filter block that provides a DC current path across the block.

27 Claims, 5 Drawing Sheets

(56) References Cited

U.S. PATENT DOCUMENTS

| | | |
|---|---|---|
| 7,146,134 B2 | 12/2006 | Moon et al. |
| 7,224,170 B2 | 5/2007 | Graham et al. |
| 7,233,771 B2 | 6/2007 | Proctor, Jr. et al. |
| 7,272,359 B2 | 9/2007 | Li et al. |
| 7,324,837 B2 | 1/2008 | Yamakita |
| 7,385,384 B2 | 6/2008 | Rocher |
| 7,421,288 B2 | 9/2008 | Funakubo |
| 7,817,958 B2 | 10/2010 | Scheinert et al. |
| 7,848,770 B2 | 12/2010 | Scheinert |
| 2005/0003873 A1 | 1/2005 | Naidu et al. |
| 2005/0148306 A1 | 7/2005 | Hiddink |
| 2005/0174749 A1* | 8/2005 | Liikamaa ............... H01P 1/2053 361/799 |
| 2005/0225411 A1 | 10/2005 | Sauder et al. |
| 2005/0281213 A1 | 12/2005 | Dohn |
| 2012/0264486 A1* | 10/2012 | Zhang ................. H01F 27/2852 455/561 |
| 2012/0293279 A1 | 11/2012 | Gong et al. |
| 2013/0049893 A1* | 2/2013 | Hendry ................. H01P 1/2088 333/202 |
| 2015/0054709 A1 | 2/2015 | Tawk et al. |
| 2015/0333386 A1* | 11/2015 | Kaneda ................... H01P 1/208 333/17.1 |
| 2016/0064815 A1* | 3/2016 | Moon ..................... H01Q 3/02 455/77 |
| 2016/0132063 A1* | 5/2016 | Chen ......................... G05F 1/46 307/31 |
| 2017/0346168 A1* | 11/2017 | Schwartzman ..... H04W 88/085 |

OTHER PUBLICATIONS http://library.ucf.edu/, Yusuf, Yazid, "Integration of High-q Filters With Highly Efficient Antennas" (2011), Electronic Theses and Dissertations. Paper 1734., 164 pages.

* cited by examiner

ANTENNA CONTINUITY

PRIORITY APPLICATIONS

This application claims the benefit of priority under 35 U.S.C. § 119 of U.S. Provisional Application No. 62/343,216, filed on May 31, 2016, the content of which is relied upon and incorporated herein by reference in its entirety.

TECHNICAL FIELD

The technology of this disclosure relates generally relates to monitoring of connectivity for electronic components such as antennas.

BACKGROUND

Wireless communications services are expanding rapidly into an ever-wider array of communications media. WiFi or wireless fidelity systems, for example, are now commonplace and being used in a variety of commercial and public settings, such as homes, offices, shops, malls, libraries, airports, and the like. Wireless distribution systems, in some applications referred to as "distributed antenna systems", or "DAS", are commonly used to improve coverage and performance of WiFi communication systems. Such systems typically include a plurality of spatially separated antennas, and communicate with a variety of such commercial communications systems to distribute their services to clients.

One approach to deploying a wireless distribution system involves deployment in a location of multiple radio frequency (RF) antenna coverage areas, such as multiple access points, also referred to as "antenna coverage areas." Combining a number of access point devices creates an array of antenna coverage areas within the location. Because each of the antenna coverage areas covers a small area, there are typically only a few users (clients) per antenna coverage area." This minimizes the amount of RF bandwidth shared among the wireless system users.

FIG. 1 illustrates distribution of communications services to coverage areas 10(1)-10(N) of a wireless distribution system 12, where 'N' is the number of coverage areas. These communications services include cellular services, wireless services such as RFID tracking, Wireless Fidelity (WiFi), local area network (LAN), WLAN, and combinations thereof. The coverage areas 10(1)-10(N) are remotely located, and created by and centered on remote access units 14(1)-14(N) connected to a central unit 16. The central unit 16 is communicatively coupled to a base station 18. If the wireless distribution system 12 is a broadband wireless distribution system, the central unit 16 receives downlink communications signals 20D in multiple frequency bands for different communications services from the base station 18 to be distributed to the remote access units 14(1)-14(N). The remote access units 14(1)-14(N) receive downlink communications signals 20D from the central unit 16 over a communications medium 22 to be distributed as downlink communications signals 20D to the respective coverage areas 10(1)-10(N). Each remote access unit 14(1)-14(N) may include an RF transmitter/receiver and a respective antenna component 24(1)-24(N) connected to the RF transmitter/receiver to wirelessly distribute the communications services to client devices 26 within their respective coverage areas 10(1)-10(N).

The remote access units 14(1)-14(N) in the wireless distribution system 12 are also configured to receive uplink communications signals 20U in multiple frequency bands from the client devices 26 in their respective coverage areas 10(1)-10(N). The uplink communications signals 20U are routed to different uplink path circuits (not shown) in the remote access units 14(1)-14(N) related to their frequency band. At the related uplink path circuits in the remote access units 14(1)-14(N), the uplink communications signals 20U are filtered, amplified, and combined together into the combined uplink communications signals 20U to be distributed to the central unit 16. The central unit 16 separates out the received combined uplink communications signals 20U into their respective bands to distribute to the base station 18.

Interference of downlink communications signals 20D and/or uplink communications signals 20U may occur in the wireless distribution system 12 due to non-linear signal processing components provided therein. For example, in the broadband wireless distribution system 12 in FIG. 1, signals in a frequency band of a given downlink communications signal 20D received and processed by a non-linear signal processing component in the central unit 16 is duplicated as harmonics in other frequency bands falling within frequency bands of other received downlink communications signals 20D.

FIG. 2 is a partial schematic of an access unit 14 having an antenna component 24 connected to a base unit 32 by a coaxial cable 34. The access unit 14 has a conventional antenna connectivity monitoring circuit on a printed circuit board (PCB) 38. The base unit 32, by way of the cable 34, provides DC power and RF communications signals to the antenna component 24. A resistor 40 and resistors 42, 44 form a voltage divider in which the voltage between resistors 42, 44 is detected by an analog-to-digital converter (ADC) 54, and is converted to a digital representation of the voltage. An RF blocking inductor 50 blocks or "chokes" RF frequencies from reaching the ADC 54. The digital connectivity indicator voltage from the ADC 54 is provided to a controller 56. If the cable 34 connecting the antenna component 24 to the base unit 32 is disconnected, the voltage between resistors 42, 44 increases, and the ADC 54 converts the new voltage to digital format and provides it to the controller 56. The controller 56 uses that digital signal to determine that the antenna component 24 is disconnected.

The monitoring circuit of FIG. 2 is shown as integrated on the PCB 38, and the antenna connects directly to components of the PCB 38.

SUMMARY

According to a first embodiment, an access unit for providing RF communications to a coverage area comprises an antenna component having a first resistive element and being configured to communicate RF signals into a coverage area, and a base unit communicatively coupled to the antenna component. The base unit comprises a filter block having processing circuitry, an RF blocking component electrically connected with the first resistive element, and a second resistive element electrically connected in series with the RF blocking component. The base unit further comprises a base unit circuit board having a third resistive element electrically connected with the second resistive element, and a controller. A communications medium connects the antenna component to the base unit. The first, second, and third resistive elements comprise a voltage divider, the controller being configured to determine a connected state of the antenna component to the base unit from the voltage between the second and third resistive elements.

According to another embodiment, an access unit comprises an antenna component configured to communicate RF signals into a coverage area, and a base unit. The base unit comprises a base unit circuit board and a filter block comprising a housing, a filter block circuit board arranged substantially parallel to and overlapping at least a portion of the base unit circuit board, processing circuitry including at least one filter, an RF blocking component electrically connected to a first resistive element, and a second resistive element electrically connected in series with the RF blocking component. A communications medium comprises at least a first and a second electrical conductor and is configured to convey bidirectional RF communications between the base unit and the antenna component and to convey power to the antenna component.

In another embodiment of the present disclosure, a plurality of access units can be incorporated into a wireless distribution system having a head end communicatively coupled to the plurality of access units. One or more of the access units can provide periodic status reports of the connected state of its base unit to its antenna component.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
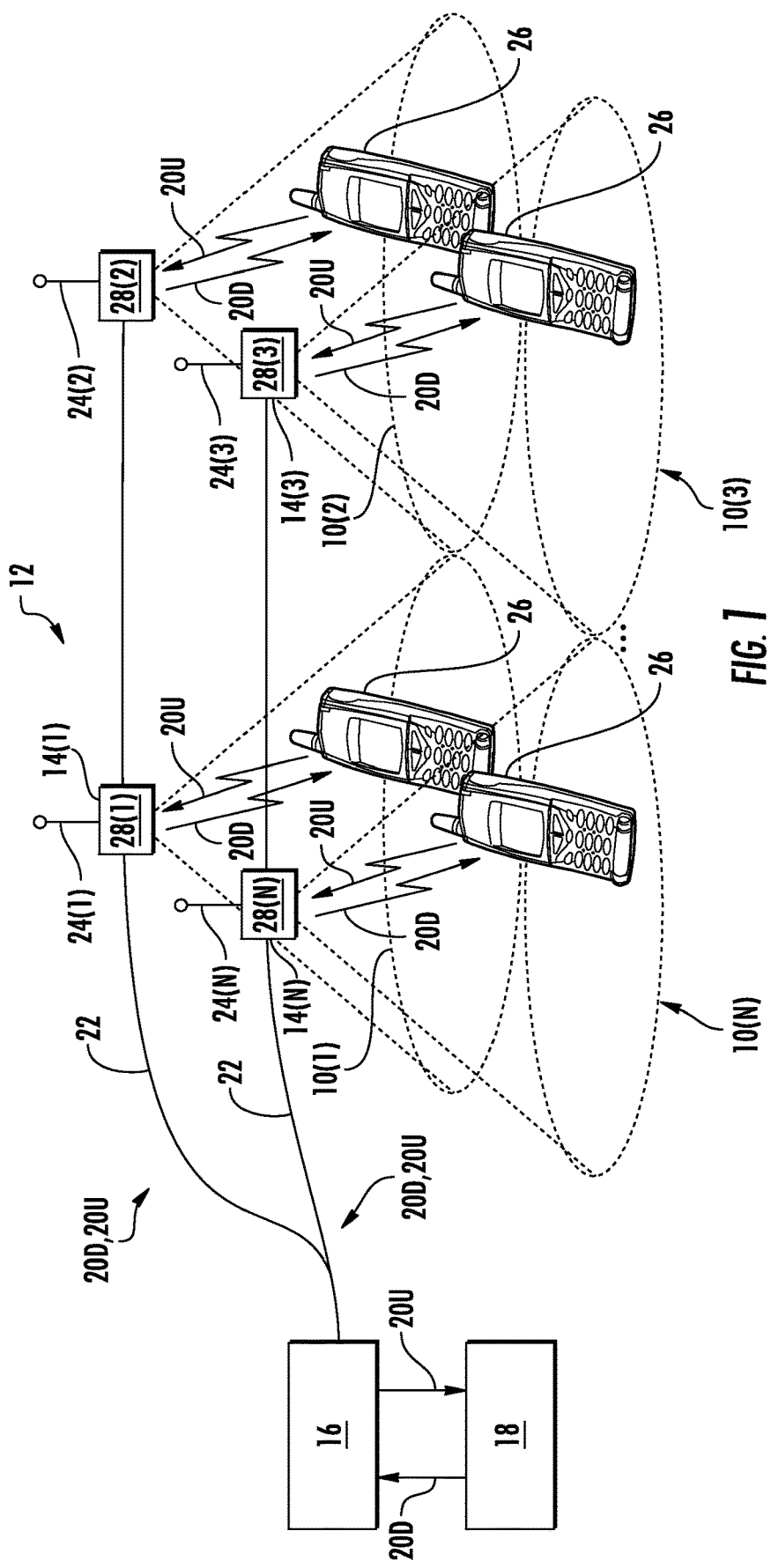
FIG. 1 is a schematic diagram of an exemplary wireless distribution system capable of distributing radio frequency (RF) communications services to client devices.
Figure 2:
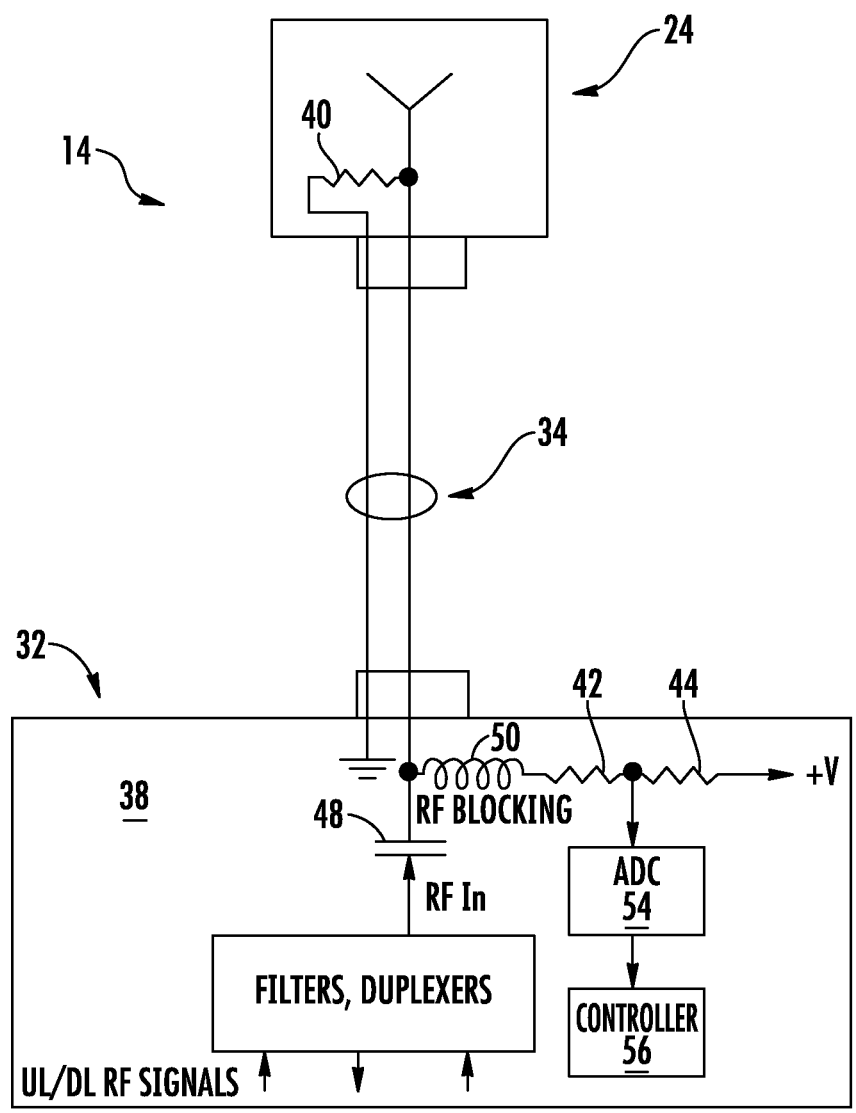
FIG. 2 is a schematic diagram of a conventional antenna monitoring circuit suitable for use in a wireless distribution system such as shown in FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Figure 3:
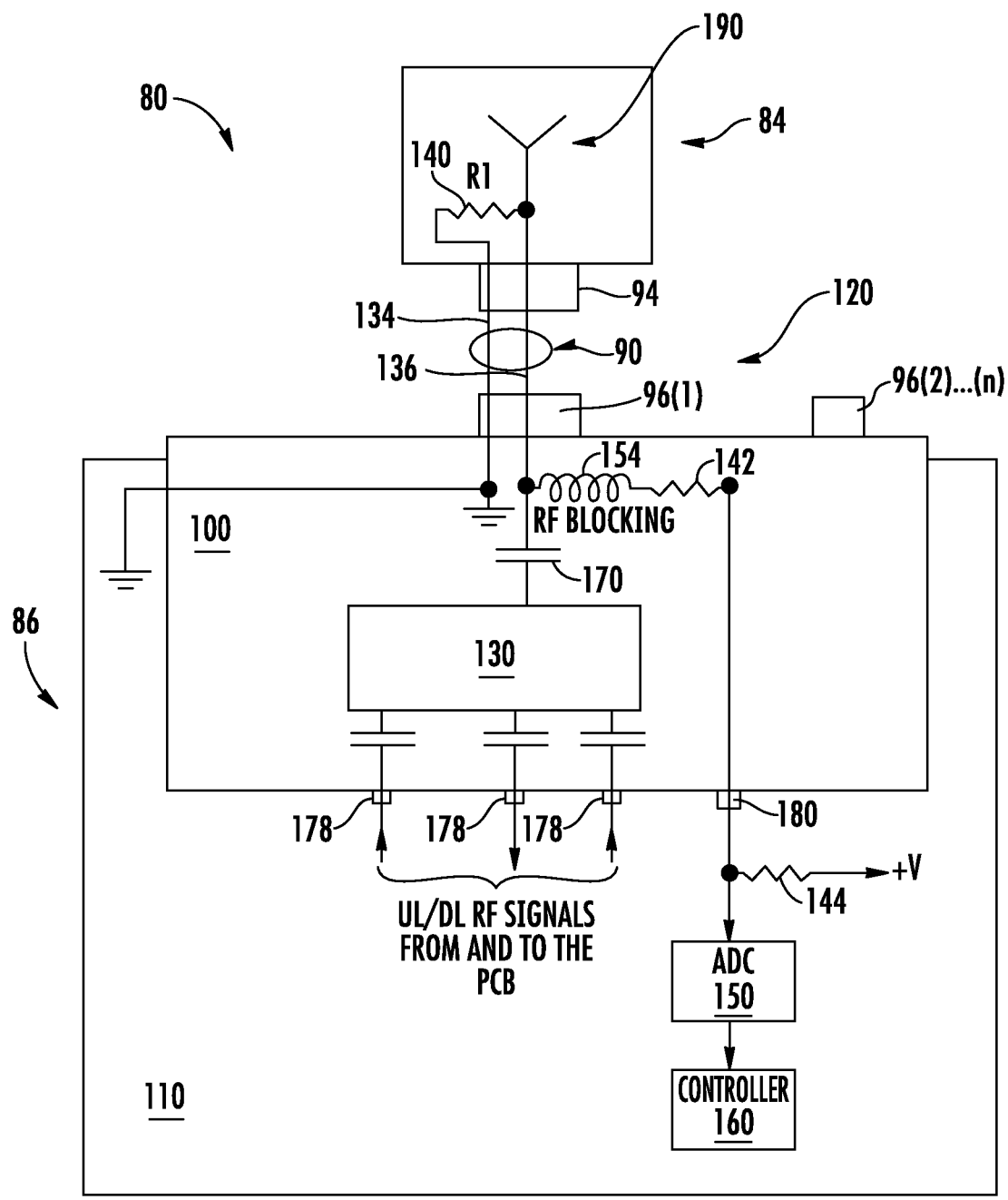
FIG. 3 is a schematic diagram of an access unit capable of providing wireless services according to a first embodiment.

FIG. 3 is a schematic diagram of selected components of an access unit 80 according to a present embodiment. The access unit 80 may be, for example, a remote component employed in a wireless distribution system, such as the WDS shown in FIG. 1, and configured to provide wireless communications to a respective coverage area. As such, the access unit 80 can be, for example, a transceiver component capable of forming and providing communications services to a coverage area in a wireless communication system. The access unit 80 can be deployed at the endpoint, or the 'edge,' of a wireless communication system.

The access unit 80 includes an antenna component 84 connected to a base unit 86 by an interconnect medium in the form of a cable 90. In general, the base unit 86 may carry out certain signal processing and conditioning functions and can be disposed within a housing, while the antenna component 84 can be deployed in a location with respect to its coverage area that is most suitable to transmit and receive RF communications. In the exemplary embodiment, the antenna component 84 is a separate component from the base unit 86, although the two can be housed within a common structure or enclosure, and/or mounted on a common structure. The base unit 86, by means of the cable 90, may provide one or both of DC power and RF communications signals to the antenna component 84. The antenna component 84 is configured to communicate RF communications (e.g. voice, data) to client devices in its coverage area, as well as receiving such signals from client devices. The cable 90 can be, for example, a coaxial cable connecting the base unit 86 and the antenna component 84 at coaxial connectors 94, 96(1). Additional coaxial connectors 96(2)-96(n) can be included on the cavity filter block 100 so that the base unit 86 can service multiple antenna components. Other cable types, such as twisted conductor pair 'category' cables, may also be used.

Figure 5:
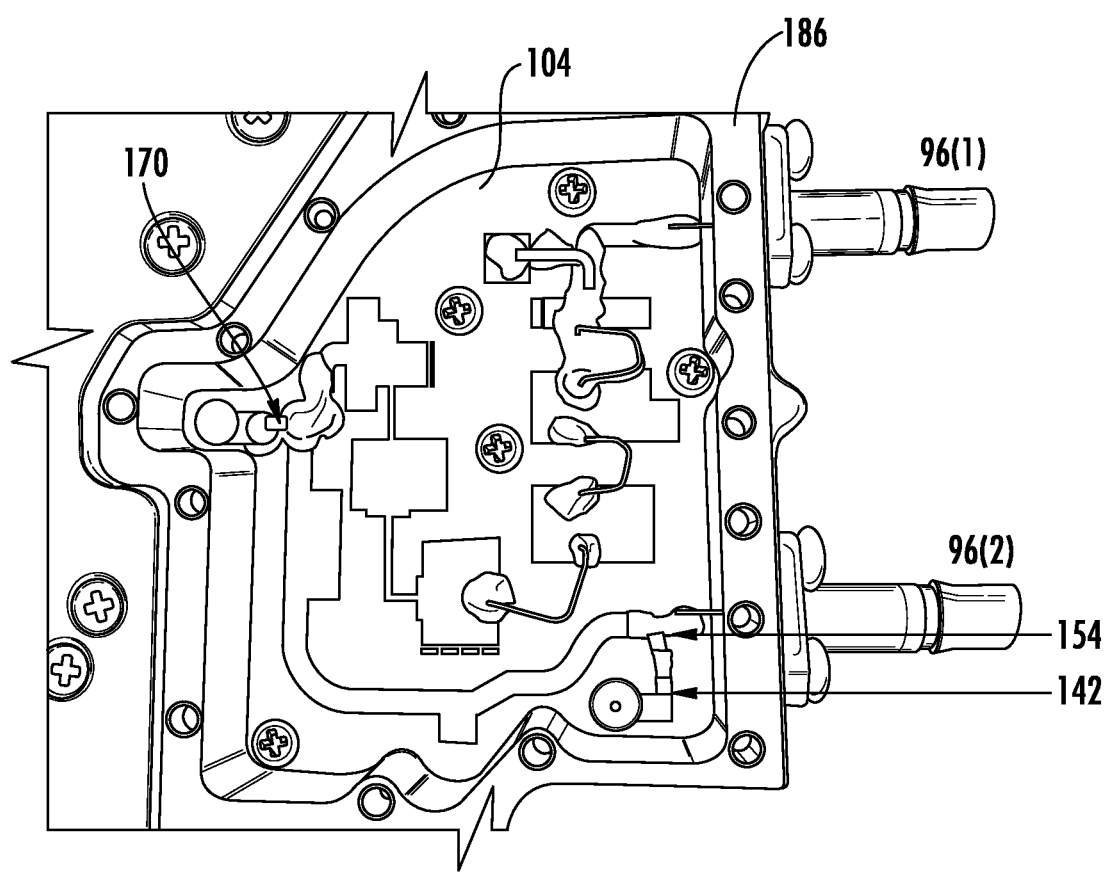
FIG. 5 is a partial cutaway view of the cavity filter block of FIG. 4 showing the interior of the block.

According to one aspect of the present embodiment, the access unit 80 includes a cavity filter block 100 having a filter block printed circuit board 104 (shown in FIG. 5). The cavity filter block 100 is operably connected to a printed circuit board 110 of the base unit, such as by being mounted on, or otherwise supported on the base unit PCB 110. The filter block PCB 104 can be, for example, directly supported on and/or connected to the base unit PCB 110 by means such as soldering at one or more locations, connection to one or more intermediary components disposed between PCB 110 and PCB 104, or by combinations thereof. The filter block PCB 104 can be joined to the base unit PCB 100 so that the two components are fixedly attached so as become, for example, an integral component not intended to be disconnected from one another in ordinary use. In the exemplary embodiment, the filter block PCB 104 is disposed over the base unit PCB 110 so that opposed major surfaces of the two generally planar boards are parallel to one another. When viewed from the perspective of FIG. 3, at least a majority (i.e., more than half) of the surface area of the filter block PCB 104 may overlap the base unit PCB 110. In one embodiment, more than 80% of the surface area of the filter block PCB 104 overlaps the base unit PCB 110.

According to another aspect, the antenna component 84 may be directly connected, by way of the cable 90, to the cavity filter block 100 at the coaxial connector 96(1). Cavity filters are effective in distributed communication systems due to their high selectivity under high power loads, reasonable size, and high quality factor, thus the connection of the antenna component 84 to the cavity filter block 100 is beneficial to the operation of the access unit 80. Communications between the antenna component 84 and the base unit PCB 110 accordingly happen by way of the cavity filter block 100.

According to yet another aspect, the access unit 80 includes a connectivity monitoring circuit 120, a portion of which is incorporated in the cavity filter block 100. The remainder of the connectivity monitoring circuit 120 can be disposed at the antenna component 84 and at the base unit PCB 110. The connectivity monitoring circuit 120 is capable of detecting the connected and disconnected states of the antenna component 84.

Still referring to FIG. 3, the base unit PCB 110 may include, for example, circuits, components and other elements that effect processing and/or conversion functions in the operation of an access unit as it provides wireless communications services to client devices within its coverage area. The exemplary schematic illustrates the cavity filter block 100 of the base unit 86 as including processing circuitry 130 used for conditioning communications signals, such as RF communications, transmitted between the antenna component 84 and additional circuitry of the PCB 110. The processing circuitry 130 can include components such as, for example, filters and duplexers. Cavity filters can be connected to, for example, the housing of the cavity filter block, as described in further detail below with reference to FIG. 4. The base unit PCB 110 may in turn be connected to another source of downlink and uplink communications, such as an aggregation point, or "head end" of a wireless distribution system, or an intermediate or 'interconnect unit' such as can be located at various locations within a wireless distribution system deployment site. The base unit 86 can include, for example, optical and/or electrical connectors (not shown) that connect the base unit 86 to one or more cables used to convey power and downlink/uplink communication signals to and from the base unit 86.

The exemplary connectivity monitoring circuit 120 is disposed amongst the antenna unit 84, the cavity filter block 100, and the remainder of the base unit PCB 110, and also includes two conductors 134 and 136 extending between the antenna component 84 and the base unit 86. The sections of the two conductors 134 and 136 extending between the units 84, 86 can be embodied by, for example, two electrical conductors of the cable 90, such as those of coaxial or a category cable. If either or both conductors 134, 136 becomes disconnected at either end, the circuit between the antenna component 84 and base unit 86 opens and the antenna component 84 will cease operating. Clients in the access unit 80 coverage area may then lose wireless connectivity to the WDS. According to one aspect of the present embodiment, the connected state of the cable 90 can be detected at the access unit 80 to ensure that the access unit 80 is restored to operation as soon as possible.

Still referring to FIG. 3, in the connectivity monitoring circuit 120, a resistor 140, illustrated by way of example as located in the antenna component 84, and resistors 142 and 144, illustrated by way of example as located in the cavity filter block 100 and base unit PCB 110 respectively, form a voltage divider. An analog-to-digital converter (ADC) 150 is electrically connected to the voltage divider so as to sense the voltage difference between the resistors 142, 144. An RF blocking component such as an inductor 154 blocks or "chokes" RF frequencies from reaching the ADC 150. The ADC 150 is configured to convert the detected voltage into a digital representation of the connected state of the antenna component 84, such as a first digital signal indicating that the antenna component 84 is connected, and a second digital signal indicating that that the antenna component 84 is disconnected. In the illustrated embodiment, a disconnect state of the antenna component 84 would be detected at the ADC 150 as an increase in voltage to +V. In operation, the ADC 150 provides the digital signal indicating the connected state to a controller 160. The controller 160 can then use that digital signal to determine, for example, that the antenna component 84 was disconnected and generate an alert. The alert can be sent to, for example, a head end or control function or other hardware of a wireless distribution system in which the access unit 80 is incorporated. A technician can then be assigned to reconnect the antenna component as needed. The controller 160 can provide, for example, indications of a change in the connected state of the antenna component, such as when the antenna component 84 is connected or reconnected by a technician, or becomes disconnected for some reason. The controller 160 can also provide scheduled periodic indications of the connected state of the antenna component 84 as a part of routine monitoring of the operational state of the wireless system.

The cavity filter block 100 may be directly connected to the antenna component 84 via the cable 90 and the connectors 94, 96(1), and thus provides a DC path via the cavity filter block 100 to additional circuitry on the PCB 110. A capacitor 170 in the block 110 can provide, for example, DC current blocking between the antenna component 84 and the filter block processing circuitry 130, while introducing minimal interference for RF signals. RF uplink and downlink processing components (not shown) on the base unit PCB 110 can be connected to the processing circuitry 130 via electrically conductive jumpers connecting to connectors 178 of the cavity filter block 100.

In the illustrative example, the RF blocking component 154 and the second resistor 142 of the connectivity monitoring circuit 120 can be incorporated in the cavity filter block 100, while the third resistor 144, ADC 150, and controller 160 are located on the base unit PCB 110. The respective portions of the connectivity monitoring circuit 120 located on the two different PCBs 104, 110 can be electrically connected across a connector 180 disposed on the filter block PCB 104.

The exemplary access unit 80 may include additional components and hardware not illustrated in the schematic of FIG. 3. For example, the base unit PCB 110 may be connected to a heat sink configured to dissipate the heat generated by the electronic components. A cover or housing can be included over the base unit 86 to conceal the electronic components from the view of persons in the coverage area. A separate cover or housing may further be included over the antenna component 84. International Application No. PCT/IL2016/050834, the entire contents of which are hereby incorporated by reference, illustrates an exemplary mounting structure for an access unit.

The antenna component 84 may include one or more RF transmitter/receivers 190 capable of transmitting RF communications into, and receiving RF communications from, a respective coverage area of the access unit 80. The controller 160 may be, for example, a CPU configured to manage several input and/or output connections for the PCB 110.

Figure 4:
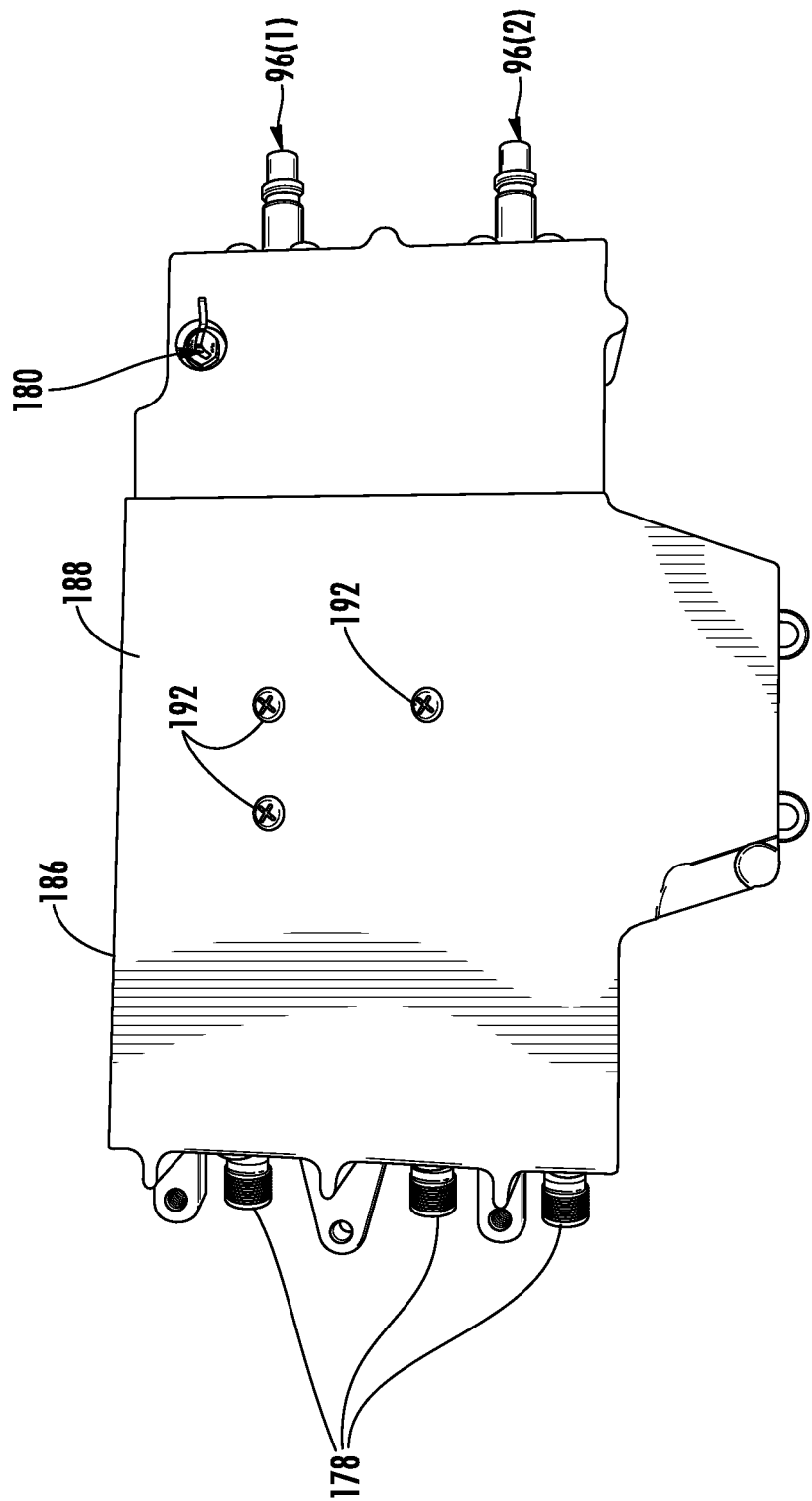
FIG. 4 is an isolated view of a cavity filter block incorporating an antenna monitoring circuit according to an embodiment.

FIG. 4 is an isolated view of the exterior of the housing 186 of the cavity filter block 100. The housing 186 can be, for example, a cast metal enclosure within an interior configured to accommodate the filter block components. An open side of the housing 186 can be enclosed by a cover 188. The housing 186 is configured to be mounted on and secured to the base unit PCB 110.

The exemplary cavity filter block 100 is illustrated as having two connectors 96(1) and 96(2) suitable for connection to, for example, two separate antenna components, or a single antenna component with multiple antennas and/or connection ports, and other arrangements of components. The base unit 86 can thus split downlink communications so that they can be provided to multiple antenna units. The connectors 178 of the cavity filter block 100 can be used for connectivity of UL/DL signals to circuitry/components of the base unit PCB 110. Portions of the processing circuitry 130, such one or more cavity filters, can be, for example, operably connected to the filter block housing 186 and disposed within the interior of the housing 186. The cavity filters can be tunable at the housing 186 exterior, such as by including one or more tuning screws 192 that are accessible from the housing exterior. The number and position of the cavity filters in the housing 186, and also the tuning screws 192, can be selected to accommodate the processing requirements of the system in which the access unit 80 is deployed. FIG. 5 is a cutaway view of the cavity filter block 100 showing the interior of the housing 186, including selected components of the filter block disposed on the filter block PCB 104.

By the term "client devices, clients or recipients of services" is meant devices such as cellular phones, smart phones, wireless computers, wireless laptop computers, mobile devices such as tablet computers, pad computers, personal digital assistant, and wireless sensors or networks of sensors, such as mesh network sensors. These examples are not intended to be limiting, and the present disclosure is not limited to these examples of client devices.

The embodiments disclosed herein are applicable to other wireless systems, including those that include other forms of communications media for distribution of communications signals, including electrical conductors and wireless transmission.

Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An access unit configured to provide radio frequency (RF) communications to a coverage area, comprising:
    an antenna component comprising a first resistive element and configured to communicate RF signals into a coverage area;
    a base unit, comprising:
        a base unit circuit board formed on a first printed circuit board;
        a cavity filter block formed on a second printed circuit board and operatively connected to the base unit circuit board, comprising:
            processing circuitry, the processing circuitry including at least one filter;
            an RF blocking component electrically connected to the first resistive element, and
            a second resistive element provided on the second printed circuit board and electrically connected in series with the RF blocking component;
        a third resistive element disposed on the first printed circuit board and electrically connected with the second resistive element, wherein the first resistive element, the second resistive element, and the third resistive element collectively form a voltage divider coupled across the antenna component, the second printed circuit board, and the first printed circuit board; and
        a controller; and
    a communications medium electrically connecting the antenna component to the base unit, wherein
    the controller is configured to determine a connected state of the antenna component to the base unit based at least on a voltage difference between the second resistive element and the third resistive element.

2. The access unit of claim 1, wherein the communications medium comprises at least a first electrical conductor and a second electrical conductor, and wherein the antenna component comprises the first resistive element disposed in series with the first electrical conductor of the communications medium.

3. The access unit of claim 2, wherein the communications medium conveys bidirectional RF communications between the base unit and the antenna component and conveys DC power to the antenna component.

4. The access unit of claim 3, wherein the communications medium comprises a coaxial cable.

5. The access unit of claim 2, wherein the antenna component comprises a first coaxial connector and the cavity filter block comprises a second coaxial connector, the communications medium connecting the antenna component to the base unit via the first coaxial connector and the second coaxial connector.

6. The access unit of claim 2, further comprising an analog-to-digital converter (ADC) disposed in series between the second resistive element and the controller, the ADC being configured to generate a digital signal in response to the voltage difference between the second resistive element and the third resistive element and to provide the digital signal to the controller.

7. The access unit of claim 6, wherein the ADC is disposed in series between the third resistive element and the controller.

8. The access unit of claim 2, wherein the connected state of the antenna component to the base unit includes:
    a state in which the antenna component is electrically connected to the base unit; and
    a state in which the antenna component is electrically disconnected from the base unit.

9. The access unit of claim 2, wherein the controller is configured to provide a periodic update as to the connected state of the antenna component to the base unit.

10. The access unit of claim 2, wherein the cavity filter block comprises a direct current blocking component electrically connected to at least one of the first electrical conductor and the second electrical conductor and disposed between the antenna component and the processing circuitry.

11. The access unit of claim 2, wherein the cavity filter block is mounted on and secured to the base unit circuit board.

12. The access unit of claim 1, wherein:
the antenna component comprises a first connector; and
the cavity filter block comprises a second connector, the communications medium connecting the antenna component to the base unit via the first connector and the second connector.

13. The access unit of claim 12, wherein the cavity filter block includes a filter block circuit board, the filter block circuit board and the base unit circuit board being arranged substantially parallel to one another and at least partially overlapping.

14. The access unit of claim 13, wherein the cavity filter block comprises a connector configured to connect the filter block circuit board to the base unit circuit board.

15. The access unit of claim 13, wherein the filter block circuit board is connected to the base unit circuit board at at least one soldered connection.

16. The access unit of claim 12, further comprising an analog-to-digital converter (ADC) disposed in series between the second resistive element and the controller, the ADC being configured to generate a digital signal in response to the voltage difference between the second resistive element and the third resistive element and to provide the digital signal to the controller, and wherein the ADC is disposed in series between the third resistive element and the controller.

17. The access unit of claim 16, wherein the third resistive element is disposed on the base unit circuit board adjacent to the cavity filter block.

18. The access unit of claim 12, wherein the processing circuitry comprises a plurality of cavity filters and a plurality of duplexers and is configured to condition RF communications signals.

19. The access unit of claim 1, wherein the cavity filter block includes a filter block circuit board, the filter block circuit board and the base unit circuit board being arranged substantially parallel to one another and at least partially overlapping.

20. The access unit of claim 19, wherein the filter block circuit board is connected to the base unit circuit board at at least one solder location.

21. An access unit configured to provide radio frequency (RF) communications to a coverage area, comprising:
an antenna component comprising a first resistive element and configured to communicate RF signals into a coverage area;
a base unit, comprising:
a base unit circuit board formed on a first printed circuit board;
a cavity filter block, comprising:
a housing;
a filter block circuit board formed on a second printed circuit board arranged substantially parallel to and overlapping at least a portion of the first printed circuit board;
processing circuitry, the processing circuitry including at least one filter;
an RF blocking component electrically connected to the first resistive element; and
a second resistive element provided on the second printed circuit board and electrically connected in series with the RF blocking component; and
a third resistive element disposed on the first printed circuit board in series with the RF blocking component, wherein the first resistive element, the second resistive element, and the third resistive element collectively form a voltage divider coupled across the antenna component, the second printed circuit board, and the first printed circuit board; and
a communications medium comprising at least a first electrical conductor and a second electrical conductor and configured to convey bidirectional communications between the base unit and the antenna component and to convey power to the antenna component.

22. The access unit of claim 21, wherein the antenna component comprises a first coaxial connector and the cavity filter block comprises a second coaxial connector, the communications medium connecting the antenna component to the base unit via the first coaxial connector and the second coaxial connector.

23. The access unit of claim 21, further comprising an analog-to-digital converter (ADC) disposed on the base unit circuit board in series with the second resistive element and connected to the cavity filter block by a connector.

24. The access unit of claim 21, wherein the filter block circuit board is connected to the base unit circuit board at at least one solder location, and the at least one filter comprises a plurality of cavity filters.

25. The access unit of claim 24, wherein the cavity filter block comprises a direct current blocking component electrically connected to at least one of the first electrical conductor and the second electrical conductor and disposed between the antenna component and the processing circuitry.

26. An access unit configured to provide radio frequency (RF) communications to a coverage area, comprising:
an antenna component comprising a first resistive element and configured to communicate RF signals into a coverage area;
a base unit, comprising:
a base unit circuit board formed on a first printed circuit board;
a cavity filter block connected to the base unit circuit board at at least one solder location, comprising:
a housing;
a filter block circuit board formed on a second printed circuit board arranged substantially parallel to and overlapping at least a portion of the base unit circuit board;
processing circuitry including a plurality of cavity filters;
an RF blocking component; and
a second resistive element provided on the second printed circuit board and electrically connected in series with the RF blocking component; and
a third resistive element disposed on the first printed circuit board in series with the RF blocking component, wherein the first resistive element, the second resistive element, and the third resistive element collectively form a voltage divider coupled across the antenna component, the second printed circuit board, and the first printed circuit board; and
a communications medium comprising at least a first electrical conductor and a second electrical conductor and configured to convey bidirectional RF communications between the base unit and the antenna component.

27. The access unit of claim 26, wherein:
the antenna component comprises a first connector; and
the cavity filter block comprises a second connector, the communications medium connecting the antenna component to the base unit via the first connector and the second connector.

\* \* \* \* \*